United States Patent Office 2,774,676
Patented Dec. 18, 1956

2,774,676

AQUEOUS BITUMEN DISPERSIONS AND A PROCESS OF MAKING THEM

Karl Meyer, Wanne-Eickel, Franz Eisenhut, Gelsenkirchen-Horst, and Adolf Siegl, Essen-Ruhr, Germany No Drawing. Application December 23, 1952, Serial No. 327,682

Claims priority, application Germany December 31, 1951

7 Claims. (Cl. 106—277)

The present invention relates to aqueous bitumen dispersions and more particularly to aqueous bitumen dispersions having excellent properties for use as coating agents and for other uses.

Protective coating agents for protection against corrosion have been frequently utilized based on mineral coal tar pitch. These coal tar pitch compositions have been dispersed in water in the presence of solid substances such as humic acids, lignic acids, finely divided brown coal, colloidal clay, etc. The application of the resulting dispersion on a surface results in an evaporation of the aqueous dispersion agent whereby the remaining bituminous material together with the solid substance forms a hard resistant film.

The dispersions hitherto prepared are however inclined to form deposits upon storage which deposits cannot again be stirred up. This results in the formation of brush grooves upon application of the dispersion by painting at which points the resistance to corrosion is greatly decreased. It has further been found that solid mineral substances of the same family and grain size, however from different localities, as those which were utilized as dispersing agent, completely fail as dispersing agents even though the same are easily wettable by water.

An object of the present invention is therefore aqueous dispersions of bitumen and a process of making them which after drying upon application to a surface have extremely good properties.

It is a further object of the present invention to provide aqueous bitumen dispersions in which a colloidal system is formed having solid and liquid phases and wherein the settling tendency of the dispersions upon prolonged storage is greatly minimized.

It is a still further object of the present invention to provide aqueous bitumen dispersions in which the solid constituents are insoluble both in the water phase and in the liquid pitch phase and the solid particles have a very small particle size.

It has been found according to the present invention that the incorporation in the aqueous bituminous dispersions of between 0.5–4% by weight of at least one polycyclic hydrocarbon having a maximum of three rings, along with at least one water dispersible mineral substance, causes the dispersion to remain so without settling over very long periods of time. The preferred amount of polycyclic hydrocarbon of two or three rings is preferably between 1–4% by weight of the weight of the dispersion.

The polycyclic hydrocarbons which are preferred for use with the present invention are those obtained from the high boiling point distillation of mineral coals and the like, such as crude naphthalene, refined naphthalene, crude anthracene, refined anthracene, crude phenanthrene, refined phenanthrene, and the like. It should be noted that crude naphthalene and raw anthracene may contain phenanthrene and carbazole in amounts of up to about 30%. It should also be noted that single polycyclic hydrocarbons of the type mentioned may be used, or any combination of polycyclic hydrocarbons.

The water dispersible mineral substances contained in the aqueous bituminous dispersion should preferably be a clay. It has also been found according to the present invention that the aqueous bituminous dispersion will have better properties if the amount of quartz in the mineral substance is minimized. More than 10% quartz in the final composition has been found to be somewhat deleterious and lesser amounts are preferred. It is further preferable to utilize a bitumen which has a Kraemer-Sarnow softening point of not more than 60° C.

The process of forming the aqueous bituminous dispersions of the present invention may either simply comprise the mixing of the chosen polycyclic hydrocarbon or polycyclic hydrocarbons with the water, bitumen and water dispersible mineral substance. The polycyclic hydrocarbon may either be first mixed with the water, the bitumen or the mineral substance. The mixing is preferably carried out at a raised temperature of preferably between 60–80° C.

The water dispersible substance utilized in the aqueous bitumen dispersions according to the present invention may either be a water dispersible clayey substance or a mineral or other substance which is either water absorbent or adsorbent or may be made absorbent or adsorbent by treatment with a wetting agent and which has a very small particle size of no more than several millimeters and which is therefore generally so fine as to be dust-like.

As carrier for the polycylic hydrocarbons it is suitable to utilize a gas condensate obtained from coking purification which may contain some of the desired polycyclic hydrocarbon but which will in any event have to have the content of hydrocarbon increased in order to obtain the required concentration according to the present invention. Such gas condensate is obtained in coking in the production of valuable coal products through cooling of the gas after removal of the ammonia and in which process the desulfurized gas is freed under pressure from benzol. By escape of the gases from the desulfurizing there is obtained a water-saturated gas at a temperature of about 30–35° C. which is then compressed at a pressure of about 7–9 atmospheres. The compression of the gas increases the temperature thereof to about 75–85° C. The gas is then fed at this pressure to a pressure cooler in which the gas by indirect cooling is cooled to a temperature of about 20° C. and a gas condensate is obtained. The gas loses the water and naphthalene contained therein until only traces remain, leaving the gas condensate. From there the gas is conducted to the consumer under pressure. The remaining gas condensate contains up to about 0.20% naphthalene, traces of light oil, is milky and has a temperature of about 20–23° C. The gas condensate consists mainly of condensed water.

It has further been determined according to the present invention that the solid substances used as dispersing agents which should have a fine grain size and be easily wetted by water, should also have an additional property, namely a suitable granular shape if it is desired to utilize the dispersion for painting purposes in which event particular properties are necessary. In this respect it has been found that the higher the quantity of quartz contained in the dispersion, the poorer the dispersion from the point of view of suitability for painting purposes. For example, clay-containing minerals possessing a flaky shape are therefore extremely suitable because of their large surface for the production of dispersion and for film formation after coating a surface with the dispersion. This building up of flakes one upon the other is destroyed by a content of quartz because of the sharp shapes of this mineral.

As tar- or pitch-like starting materials for the dispersions it is suitable to utilize mineral coal pitch or mineral coal tar pitch which may be obtained for example from any of the following substances: high temperature coke oven tar, low temperature tar, generator tar, horizontal retort tar, vertical retort tar, oil gas tar, water gas tar, etc. These tars can either be worked up alone or together to tar pitch.

The pitch utilized should preferably have a softening point which is no higher than 60° C. according to Kraemer-Sarnow, or if it has a higher softening point it should preferably be refluxed until the Kraemer-Sarnow softening point is no higher than 60° C. By softening point according to Kraemer-Sarnow it is to be understood as that temperature at which a mercury column in a little tube having an inner diameter of 6 mm. and weighing 5 g. passes through a tar pitch or bitumen layer of 5 mm. height which is contained in a little tube having the same inner diameter.

It has further been determined that the same good action is obtained by use instead of mineral coal pitch or mineral coal tar pitch, the so-called mineral coal tar-special pitch, either mineral coal tar or mineral coal tar pitch which is fluxed with tar oil in combination with decomposed coal or is formed by bubbling of air therethrough.

For the production of such special pitch with increased plastic properties it is suitable to utilize as starting product mineral coal tar pitch which has a high Kraemer-Sarnow softening point of about 130–140° C. and which has a content of about 50% free carbon. Such hard pitch is fluxed with a high boiling tar oil to form the soft pitch which may have the softening point thereof varied depending upon the amount of fluxing oil utilized.

These masses can be further combined with coal decompositions in order to increase the plastic properties thereof. By coal decomposition is meant for example 80% of the preceding mass is treated with 10–20% of coal dust obtained by treatment of a vitreous coal under atmospheric pressure while stirring for several hours (i. e. about 6 hours) at a temperature of about 200° C. Highly plastic pitch obtained in this manner can be given the desired softening point by the addition of high boiling tar oil in a suitable amount. Furthermore, the plasticity of such special pitch can be increased by so-called bubbling of tar or tar pitch with air at a temperature of about 200–300° C. This results in an increase of the softening point. The obtained bubbled mass can have the softening point thereof lowered to the desired degree by the addition of high boiling tar oils thereto.

Other pitch-like starting material of an aromatic type may also be utilized according to the present invention as for example wash oil pitch. For the washing out of benzols and the homologs thereof from the coke oven gas, phenol oil-free and naphthalene-free tar oil is utilized, which boils between 200–300° C. and which contains only small amounts of water. This wash oil is used after enriching with benzol hydrocarbon-containing coke oven gas which after removal of the steam and recycling may be further utilized for the washing of benzol hydrocarbons. In the course of time the wash oil thickens due to the presence of hydrogen sulfide and oxygen. If the thickening reaches too advanced a degree, the thickly viscous wash oil is regenerated by distillation whereby the wash oil pitch remains as a residue of distillation bubbles.

According to the present invention it is also possible to utilize as well as pitch previously mentioned, pitch obtained from various sources, which pitch by fluxing with tar oil in combination with coal decompositions or by bubbling of air is transformed into a special pitch. It is further advantageous according to the present invention to utilize the gas condensate described above as carrier for the naphthalene or other polycyclic hydrocarbon since such gas condensate by the content therein of some organic substances is extremely well adapted to serve as a carrier for the hydrocarbon.

The following examples are given as illustrative of preferred embodiments according to the present invention, the scope of said invention not however being limited to the examples given.

Example 1

3.0 kg. of a gas condensate to which is added an amount of naphthalene or anthracene corresponding to 2% by weight of the weight of the final dispersion is mixed in a heater mixer with 3.9 kg. of washed kaolin to which is further added 7.5 kg. of melted mineral coal tar pitch (Kraemer-Sarnow softening point 35–40° C.). The temperature of the mixer is maintained at 60–80° C. During and after ending of the addition of mineral coal tar pitch there is further added 6 kg. of gas condensate.

The most suitable mixer is a mixing-kneading machine. The vessel for taking up the dispersion is heatable and coolable. The inner intermixing of the substances is accomplished with the aid of wide blades which are also heatable and coolable. The speed of rotation of these blades can be adjusted by means of an adjusting device. The mixing speed is increased by means of a pneumatic pressing stamp which also increases the kneading power of the machine.

The resulting product has the following properties: It is slate-gray and has a creamy consistency. The flowing time of flow in a viscosimeter utilized for street tar (having 5 mm. nozzle/20° C.) takes about 12–14 seconds. Furthermore, after storage, even for many months, in a closed vessel there is scarcely any sediment and the sediment found may be easily stirred up. By the addition of naphthalene the dispersion material becomes fattier, which makes it more suitable for painting and makes the application thereof as a paint easier. Furthermore, the colors of the dry material, it being possible to include pigments in the composition of the present invention, is lighter than without the use of naphthalene.

Example 2

41.5 kg. of gas condensate which has 2.0 kg. of finely divided raw naphthalene added thereto is thoroughly mixed at 60–80° C. with 19.5 kg. of washed kaolin containing 10% quartz. 37.0 kg. of mineral coal tar pitch (having a Kraemer-Sarnow softening point of 35–40° C.) is then added thereto in hot condition (120° C.) and is thoroughly mixed in a mixer. The resulting dispersion is homogeneous and after drying forms a film of uniform consistency.

Example 3

38.0 gas condensate to which 2.0 kg. of naphthalene is added is mixed at 60–80° C. with 20.7 kg. of washed kaolin and at this temperature is added 39.3 kg. of special pitch which is previously melted and mixed in heated condition. The resulting dispersion is uniform and suitable for painting purposes.

Example 4

41.0 kg. of gas condensate to which is added 2.0 kg. of raw anthracene is mixed at a temperature of 60–80° C. with 19.0 kg. of washed kaolin to which is then added and mixed while hot 40.0 kg. of melted wash oil pitch. The resulting dispersion is homogeneous and has a dark-gray color.

Example 5

19.0 kg. of washed kaolin containing only small amounts of free silicic acid is mixed with 39.5 kg. of water at a temperature of 60–80° C. 39.5 kg. of a special pitch prepared as described above, and 2.0 kg. of naphthalene is added thereto while vigorously stirring. The resulting product is uniform throughout and has high qualities as painting agent.

The dispersion produced according to this process contains a high quantity of water (about 40%) instead of the usual amount of solvent. This of course therefore greatly reduces the cost of the dispersion and also reduces the inflammability thereof. There is the danger that if the dispersion according to the present invention is utilized on iron bases, the iron may react with the water before the same evaporates and become rusted. The rust may then peel off and the paint may be peeled off with the same. This danger may be overcome by first coating the iron base with some substance such as pitch lacquer.

The application of a gas condensate for the dispersion is, as shown in Example 5, not necessary. It is possible to add the desired amount of naphthalene to the molten tar pitch mass shortly before the production of the dispersion whereby the naphthalene is quickly dissolved.

The dispersions according to the present invention of mineral coal tar pitch and special pitch may be used in combination with mineral substances which can be poured, are hard or may be applied by means of a spatula, for the production of street surfaces. The dispersions may also be used for the layers between bricks. In such case it is unnecessary for the dispersions to have the same properties which are necessary for the dispersions utilized as painting agents.

*Example 6*

As intermediate layer between foundation and a vessel, for example a tank for tar oil, a dispersion prepared according to any one of Examples 1–5 may be utilized and mixed shortly before application with a fine sand having a maximum grain size of 0.2 mm. in a proportion of 1 part by weight dispersion to 4 parts by weight sand. The thus produced intermediate layer serves as a mortar and hardens to a solid, yet smooth under-layer which does not form cracks even after filling of the tank.

*Example 7*

For the production of masses to be utilized in making wells a dispersion is formed according to any one of Examples 1–5 with the further addition of 5% by weight iron oxide as pigment. The red dyed dispersion is thoroughly mixed with fine sand having a maximum grain size of 0.2 mm. in the proportion of 1 part by weight dispersion per 5 parts by weight sand. The resulting material is suitable for the production of wells and results after evaporation of the water therefrom in a resistant mass which does not absorb any water and which is impermeable also to acids, alkalis, and oils.

*Example 8*

A dispersion is formed by mixing and heating 38% soft pitch (Kraemer-Sarnow softening point of 55° C.), 2% raw anthracene, 19% clay and the remainder water; the dispersion is mixed with a calcium cement mixture in combination with fine sand according to the hardness desired. This mixture is suitable as coating for streets, factory corridors, etc. The amount of dispersion in this case must be less than 30% by weight.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A stabilized aqueous bitumen dispersion, consisting essentially of a bitumen having a maximum Kraemer-Sarnow softening point of 60° C. dispersed in water by finely divided solid particles of at least one water-dispersible mineral, said bitumen and said mineral dispersed in said water having a tendency to settle; and between 0.5–4% by weight of at least one polycyclic condensed ring aromatic hydrocarbon having a maximum of three rings being added thereto, said polycyclic hydrocarbon stabilizing said dispersion and reducing the tendency of said bitumen and said mineral dispersed in said water to settle.

2. A stabilized aqueous bitumen dispersion, consisting essentially of a bitumen having a maximum Kraemer-Sarnow softening point of 60° C. dispersed in water by finely divided solid particles of at least one water-dispersible mineral, said bitumen and said mineral dispersed in said water having a tendency to settle; and between 0.5–4% by weight of at least one polycyclic condensed ring aromatic hydrocarbon selected from the group consisting of naphthalene, anthracene and phenanthrene being added thereto, said polycyclic hydrocarbon stabilizing said dispersion and reducing the tendency of said bitumen and said mineral dispersed in said water to settle.

3. A stabilized aqueous bitumen dispersion, consisting essentially of a bitumen having a maximum Kraemer-Sarnow softening point of 60° C. dispersed in water by finely divided solid particles of kaolin, said bitumen and said kaolin dispersed in said water having a tendency to settle; and between 0.5–4% by weight of at least one polycyclic condensed ring aromatic hydrocarbon having a maximum of three rings being added thereto, said polycyclic hydrocarbon stabilizing said dispersion and reducing the tendency of said bitumen and said kaolin dispersed in said water to settle.

4. A stabilized aqueous bitumen dispersion, consisting essentially of a bitumen having a maximum Kraemer-Sarnow softening point of 60° C. dispersed in water by finely divided solid particles of kaolin containing a maximum of 10% quartz, said bitumen and said kaolin dispersed in said water having a tendency to settle; and between 0.5–4% by weight of at least one polycyclic condensed ring aromatic hydrocarbon having a maximum of three rings being added thereto, said polycyclic hydrocarbon stabilizing said dispersion and reducing the tendency of said bitumen and said kaolin dispersed in said water to settle.

5. A stabilized aqueous bitumen dispersion, consisting essentially of a bitumen having a maximum Kraemer-Sarnow softening point of 60° C. dispersed in water by finely divided solid particles of kaolin containing a maximum of 10% quartz, said bitumen and said kaolin dispersed in said water having a tendency to settle; and between 0.5–4% by weight of at least one polycyclic condensed ring aromatic hydrocarbon selected from the group consisting of naphthalene, anthracene and phenanthrene being added thereto, said polycyclic hydrocarbon stabilizing said dispersion and reducing the tendency of said bitumen and said kaolin dispersed in said water to settle.

6. A process of forming a stabilized aqueous bitumen dispersion which comprises adding to each other in any desired sequence and intimately mixing a bitumen having a maximum Kraemer-Sarnow softening point of 60° C., water, finely divided solid particles of at least one water-dispersible mineral and at least one polycyclic condensed ring aromatic hydrocarbon having a maximum of three rings, the amount of said added polycyclic condensed ring aromatic hydrocarbon being such that the amount of polycyclic condensed ring aromatic hydrocarbon in the thus formed mixture is between 0.5–4% by weight of the same, thereby obtaining a stabilized dispersion of said bitumen and said mineral dispersed in said water.

7. A process of forming a stabilized aqueous bitumen dispersion which comprises adding to each other in any desired sequence and intimately mixing a bitumen having a maximum Kraemer-Sarnow softening point of 60° C., water, finely divided solid particles of at least one water-dispersible mineral and at least one polycyclic condensed ring aromatic hydrocarbon selected from the group consisting of naphthalene, anthracene and phenanthrene, the amount of said added polycyclic condensed ring aromatic hydrocarbon being such that the amount of polycyclic condensed ring aromatic hydrocarbon in the thus formed mixture is between 0.5–4% by weight of the same, thereby obtaining a stabilized dispersion of said bitumen and said mineral dispersed in said water.

References Cited in the file of this patent

UNITED STATES PATENTS

| | | |
|---|---|---|
| 482,890 | Grunzweig | Sept. 20, 1892 |
| 924,086 | Meadows | June 8, 1909 |
| 1,107,020 | Berend | Aug. 11, 1914 |
| 1,198,769 | Richardson | Sept. 19, 1916 |
| 1,787,418 | Lewis | Dec. 30, 1930 |
| 1,890,220 | Hill | Dec. 6, 1932 |
| 2,194,218 | Dickeson | Mar. 19, 1940 |
| 2,327,882 | Gabriel et al. | Aug. 24, 1943 |
| 2,332,933 | Roediger | Oct. 26, 1943 |
| 2,521,783 | Farber | Sept. 12, 1950 |

FOREIGN PATENTS

| | | |
|---|---|---|
| 134,223 | Great Britain | Apr. 22, 1921 |
| 130,635 | Australia | Dec. 10, 1932 |